United States Patent
Holtmann et al.

(10) Patent No.: US 12,325,036 B2
(45) Date of Patent: Jun. 10, 2025

(54) ATOMIZER CHANGING SYSTEM FOR MULTI-AXIS HOLLOW-WRIST COATING ROBOTS

(71) Applicants: BASF COATINGS GMBH, Münster (DE); POMA SYSTEMS GMBH, Kalbach (DE)

(72) Inventors: Matthias Holtmann, Münster (DE); Marc Kuenz, Münster (DE); Sven Bemmann, Würzburg (DE); Klaus Rosendahl, Münster (DE); Daniel Puls, Kalbach (DE); Wolf-Ruediger Mathiak, Kalbach (DE); Felix Balzer, Kalbach (DE)

(73) Assignees: BASF COATINGS GMBH, Muenster (DE); POMA SYSTEMS GMBH, Kalbach (DE)

( * ) Notice: Subject to any disclaimer, the term of this patent is extended or adjusted under 35 U.S.C. 154(b) by 195 days.

(21) Appl. No.: 17/907,033

(22) PCT Filed: Mar. 25, 2021

(86) PCT No.: PCT/EP2021/057812
§ 371 (c)(1),
(2) Date: Sep. 22, 2022

(87) PCT Pub. No.: WO2021/191383
PCT Pub. Date: Sep. 30, 2021

(65) Prior Publication Data
US 2023/0124016 A1    Apr. 20, 2023

(30) Foreign Application Priority Data
Mar. 25, 2020   (EP) .................................. 20165481

(51) Int. Cl.
*B05B 13/04*     (2006.01)
*B05B 15/18*     (2018.01)
*B05B 15/65*     (2018.01)

(52) U.S. Cl.
CPC .......... *B05B 13/0431* (2013.01); *B05B 15/18* (2018.02); *B05B 15/65* (2018.02); *B05B 13/0452* (2013.01)

(58) Field of Classification Search
USPC ........................................ 118/300, 323, 321
See application file for complete search history.

(56) References Cited

U.S. PATENT DOCUMENTS

| 6,349,884 B1 | 2/2002 | Thome et al. |
| 2006/0102075 A1* | 5/2006 | Saylor .................. B05B 12/085 |
| | | 118/313 |

(Continued)

FOREIGN PATENT DOCUMENTS

| DE | 102009013979 A1 | 9/2010 | |
| DE | 102012022535 A1 | 5/2014 | |
| WO | WO-2010105849 A1 * | 9/2010 | ......... B05B 13/0271 |

OTHER PUBLICATIONS

English Translation WO2010105849A1 (Year: 2010).*

(Continued)

*Primary Examiner* — Yewebdar T Tadesse
(74) *Attorney, Agent, or Firm* — Armstrong Teasdale LLP

(57) ABSTRACT

Described herein is an atomizer changing system, including a master unit and at least one slave unit, where the master unit has at least the following components: a releasable connecting element, surrounding a center of the master unit, for a nonpositive and positive connection (KS, FS) of the master unit to the slave unit, a coupling plate arranged in the center of the master unit and having a plurality of coupling points for supplying an atomizer that can be connected thereto with substances, energy and/or information, and an (Continued)

adapter for connecting the master unit to a hollow wrist of a coating robot; and where the slave unit has at least the following components: a coupling plate for connecting the slave unit to the master unit and to the atomizer; and a releasable connecting element for connecting the slave unit to the atomizer.

10 Claims, 4 Drawing Sheets

(56) References Cited

U.S. PATENT DOCUMENTS

| | | |
|---|---|---|
| 2008/0236484 A1* | 10/2008 | Herre ............... B05B 12/14 118/258 |
| 2009/0108109 A1 | 4/2009 | Mori et al. |
| 2012/0006916 A1 | 1/2012 | Nolte et al. |
| 2015/0328655 A1 | 11/2015 | Reichler et al. |

OTHER PUBLICATIONS

International Search Report and Written Opinion for corresponding PCT/EP2021/057812 mailed Jun. 15, 2021; 18 pages, Appended with English translation.

* cited by examiner

ATOMIZER CHANGING SYSTEM FOR MULTI-AXIS HOLLOW-WRIST COATING ROBOTS

CROSS-REFERENCE TO RELATED APPLICATIONS

This application is a U.S. National Phase Application of PCT/EP2021/057812, filed Mar. 25, 2021, which claims the benefit of priority to European Patent Application No. 20165481.1, filed Mar. 25, 2020, the entire contents of which are hereby incorporated by reference herein.

The invention relates to an atomizer changing system, which can change high-rotation and pneumatic atomizers on multi-axis hollow-wrist coating robots, preferably in a fully automatic way.

TECHNOLOGICAL BACKGROUND

When coating or painting high-value components, as is customary inter alia in the automotive industry, exacting requirements are imposed on the coating. These cannot be formed by a single coating substance; instead, there is a need here for a coating system consisting of a number of layers, wherein each layer performs a defined function. Thus, it is customary in the automotive sector to use three- to four-layer structures. In general, such multi-layer coating systems consist of a primer coating medium, at least one base coat and at least one (2-component) clearcoat. Owing to different characteristics and a different application coating thickness to be achieved, each of these coating media is generally applied using different atomizers. Moreover, the composition of the coating medium plays a significant role. Thus, there are, for example, water-based or solvent-based base coats, while typical 2-component clearcoats contain solvents. Without prior cleaning of the application device, it is not possible to change over between water-based and solvent-based coating substances after carrying out a painting operation since contact between the coating substances or mixing of said substances generally leads to unwanted reactions.

Another application problem consists in that high-rotation atomizers are inferior to pneumatic atomizers in respect of the ability to reach areas that are difficult to access, since they are considerably larger in terms of structural design.

Owing to the setup time and the associated stoppage of the painting operation in the painting booth or along the entire painting line, manual conversion of a robot to the respective atomizer should be avoided. For this reason, a separate robot is generally required for each individual atomizer.

Tool changing systems for so-called handling robots are known. These comprise a centrally arranged clamping element to enable the coupling element (slave) on the tool to be grabbed and locked by the coupling element (master) on the robot. Depending on requirements, various modules are mounted around this clamping element in order to couple the substance, energy and information flows required for the functioning of the tool. These coupling systems are all composed of conductive materials and therefore cannot be installed in the high-voltage zone. They are established solutions for use on a handling robot without a "hollow wrist".

Fully automatic atomizer changing systems are also known from the field of painting technology (Prauser & Brinckmann in: Journal für Oberflächentechnik 2013(7) 20-21). These comprise a robot-mounted master plate, by means of which it is possible to receive various slave plates on which the atomizers are mechanically mounted and connected to hoses. The slave units are situated in changing stations within a paint booth. In this way, a robot can change the atomizers in a fully automatic way. The changing system can couple all the media and signals required for the operation of a high-rotation atomizer and is suitable for the operation of atomizers with external and internal charging and paint guns. Here too, as in the tool changing system described above, the actual clamping element is situated in the center, while the actual coupling points for substances, energy and information are arranged on the outside. This arrangement takes up a lot of space, which has a negative effect on the overall kinematics. Moreover, in the above-mentioned atomizer changing system, components such as couplings, the clamping system, holders etc. are made of metal, and this can lead to unwanted side effects when operating under high voltage (free capacity). Furthermore, all the hose lines of the slave unit are open and very largely unprotected, as a result of which the entire unit is susceptible to contamination by overspray.

In the area of application of motor vehicle painting, "hollow-wrist" painting robots, which have already been mentioned above, are being used in multiple ways. These typically have four, five or six axes and have the special characteristic that the lines for substances, energy and information are passed through the "hollow wrist" of the robot and are thus inaccessible to contamination by overspray. In addition, the "slim" design also makes it possible to reach points on the object to be painted which would not be accessible if the lines were routed externally. However, changing the atomizers on multi-axis hollow-wrist painting robots of this kind has hitherto been expensive, in particular time-consuming and possible only by hand.

It is the underlying object of the invention to provide an atomizer changing system which does not have the disadvantages of the prior art and, particularly in the relatively large space case of atomizers with a requirement, makes optimum use of this space and thus improves the accessibility of the surfaces to be painted, especially in the case of complex, three-dimensional substrates to be painted. At the same time, external soiling of the lines carrying the substances, energy and information by overspray, for example, should be minimized. In this way, less soiling of the lines should make it possible for the changeover times between different atomizers to be reduced and also to lower the risk of contamination of subsequent paint layers by soiled external hoses and lines.

In addition, the atomizer changing system should allow rapid, fully automatic changing between different atomizers and thus also between different coating medium systems. The number of painting robots required for multi-layer painting should also be reduced inasmuch as one painting robot can be fitted with different atomizers in rapid succession. This allows the application of various coating media, e.g. aqueous or solvent-based single- or two-component coating media.

As a particularly advantageous possibility, it should be possible to use the atomizer changing system with different atomizers, e.g. high-rotation atomizers and pneumatic atomizers. It should preferably be possible to use any conventional type of atomizer.

It should be possible to use the atomizer changing system on a multi-axis painting robot, thus enabling the painting robot to change the atomizer automatically without human intervention.

DESCRIPTION

Figure 1:
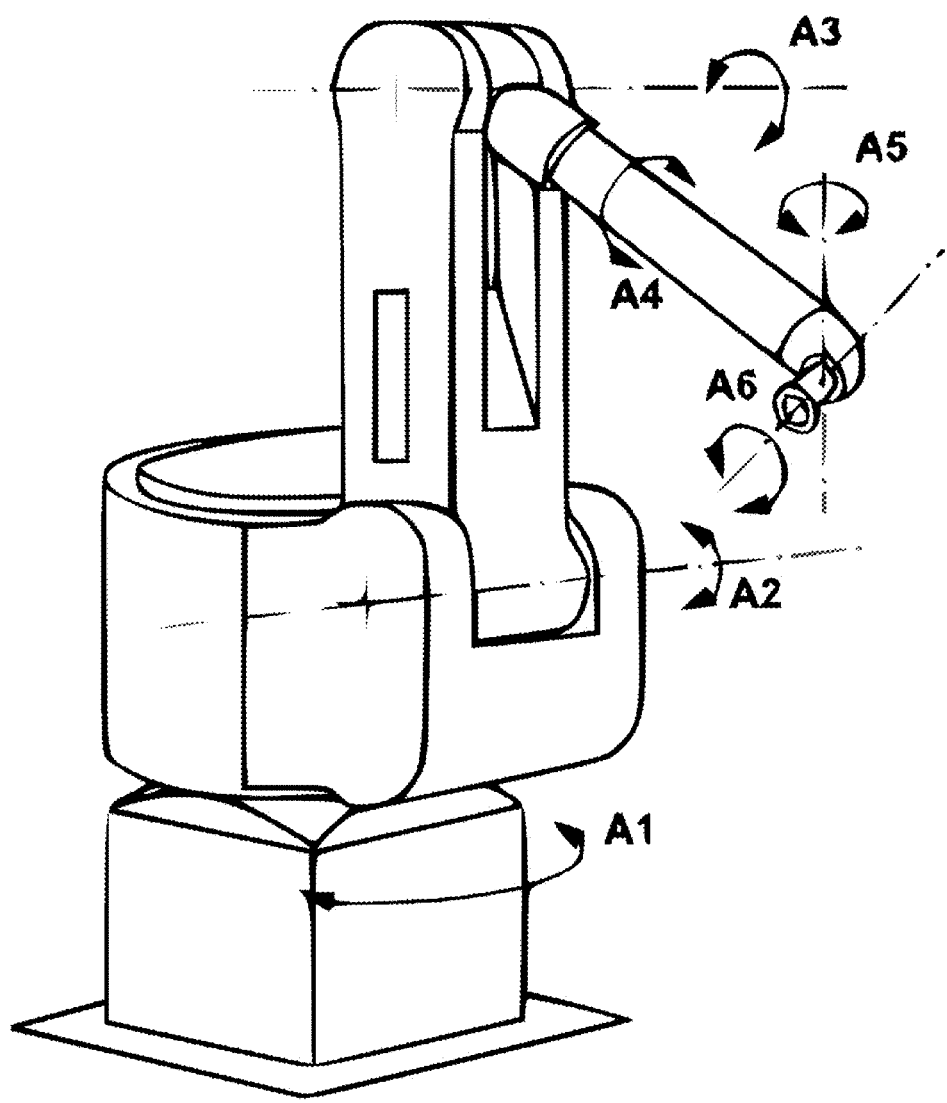
FIG. 1 illustrates a typical multi-axis coating robot.

It was possible to achieve the above-mentioned objects by providing an atomizer changing system for a multi-axis hollow-wrist coating robot, wherein the atomizer changing system comprises a master unit (1) and at least one slave unit (2), and wherein the master unit (1) has at least the following components:
  a releasable master-side connecting element (1.1), surrounding the center of the master unit (1), for the nonpositive and positive connection (KS, FS) of the master unit (1) to the slave unit (2),
  a coupling plate (1.2) arranged in the center of the master unit (1) and having a plurality of coupling points for supplying an atomizer that can be connected thereto with substances, energy and/or information, and
  an adapter (1.3) for connecting the master unit (1) to a hollow wrist of a coating robot; and
wherein
the slave unit (2) has at least the following components:
  a coupling plate (2.2) for connecting the slave unit (2) to the master unit (1) and to an atomizer, wherein the coupling plate (2.2) is firmly connected on the atomizer side to lines and/or to an adapter plate for supplying the connectable atomizer with substances, energy and/or information; and
  a releasable connecting element (2.4) for connecting the slave unit (2) to an atomizer.

The atomizer changing system is referred to below as the atomizer changing system according to the invention.

Figure 2:
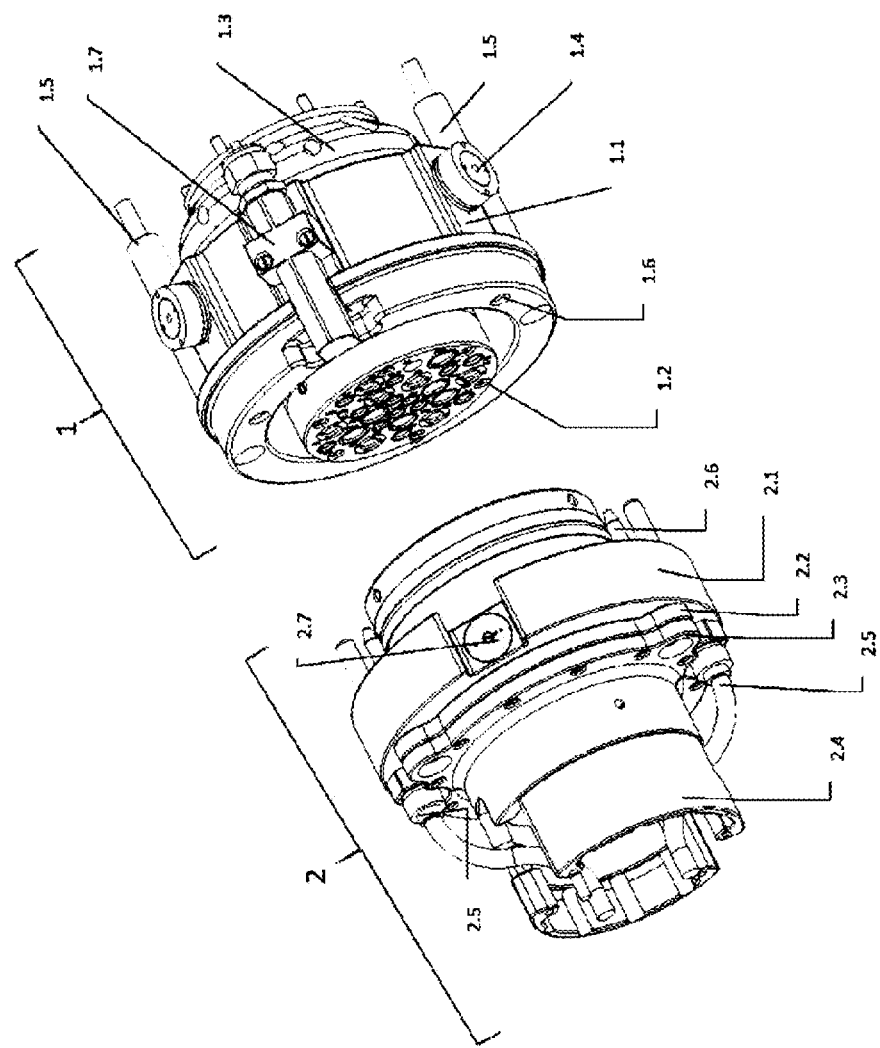
FIG. 2 illustrates the structure of the atomizer changing system.
Figure 3:
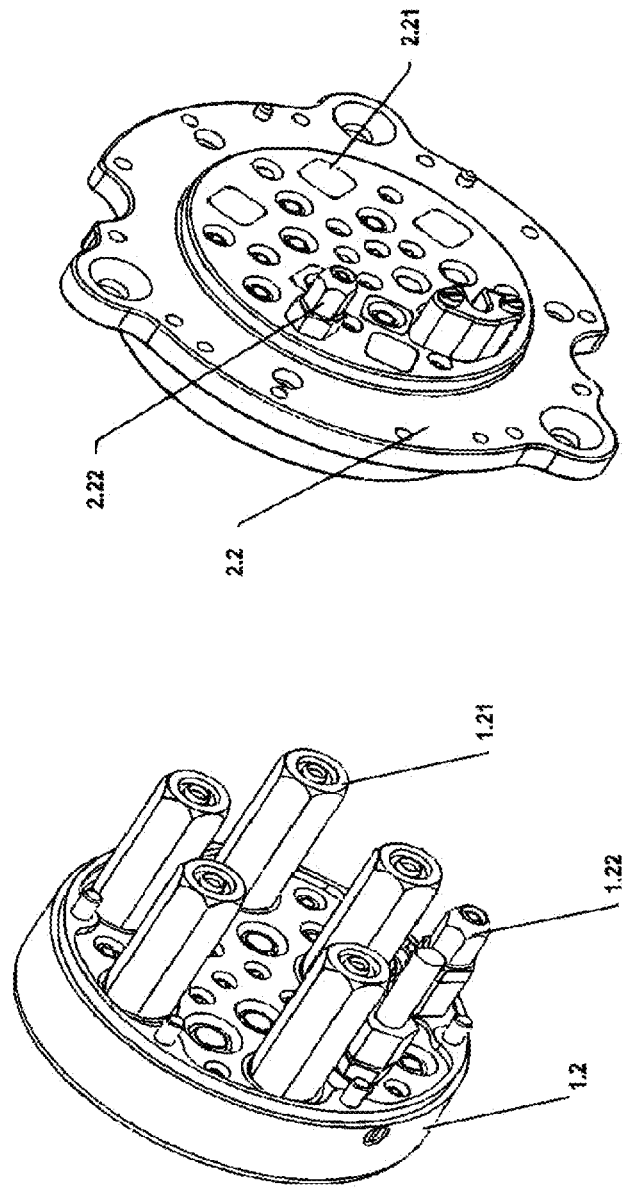
FIG. 3 illustrates the design of the coupling plates.
Figure 4:
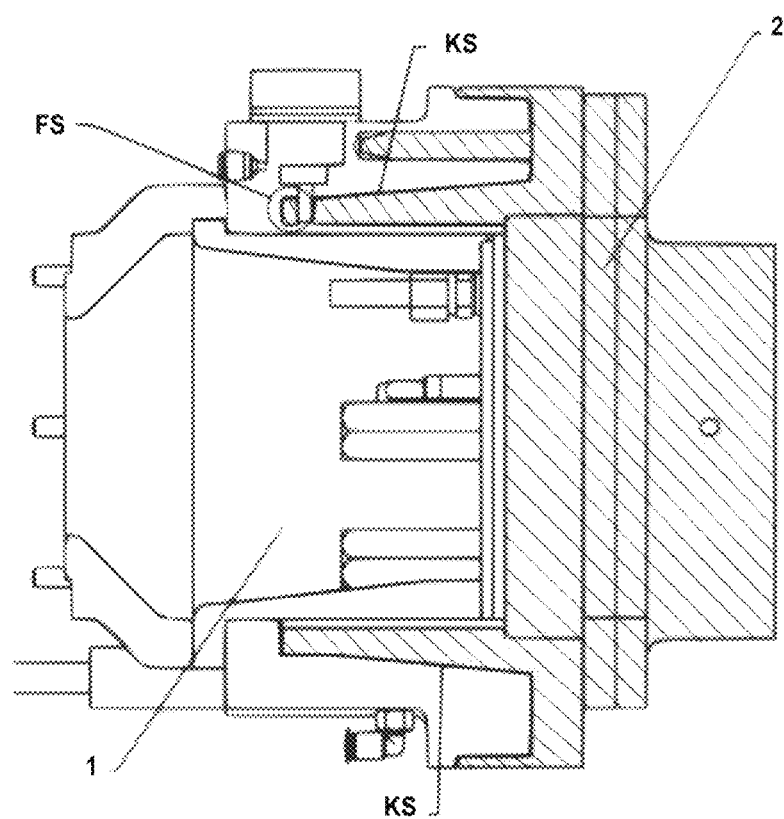
FIG. 4 illustrates the nonpositive (KS) and positive (FS) connection of the master unit (1) to the slave unit (2).

FIGS. 2 and 3 show, by way of example, the structure of the atomizer changing system (FIG. 2) and the design of the coupling plates (FIG. 3:1.2, 2.2). FIG. 4 illustrates the nonpositive (KS) and positive (FS) connection of the master unit (1) to the slave unit (2).

The multi-axis coating robots are those with a "hollow wrist". All the lines required to supply the atomizer can be passed through said wrist. A typical multi-axis coating robot is illustrated in FIG. 1, for example (from: D. Ondratschek (Ed.), Jahrbuch Besser Lackieren 2008 [Better Painting Yearbook], 65th edition), in which this robot is embodied as a 6-axis coating robot. The six axes are denoted by A1 to A6 in FIG. 1.

Multi-axis hollow-wrist coating robots preferably have four, five, six or more axes. As a particular preference, this is preferably a six-axis hollow-wrist coating robot in the context of the invention.

Whereas, in the case of the multi-axis coating robots known from the prior art, the lines for substances, energy and/or information which are required to supply the atomizer are routed along the outside of the robot arm, and therefore both the space requirement and the tendency for soiling are increased, the atomizer changing system according to the invention makes it possible to attach or change many different types of atomizer in a simple manner, either manually but preferably fully automatically, without fixed installation of all the lines from the hollow wrist to the atomizer.

This is achieved by virtue of the fact that the master unit (1) of the atomizer changing system according to the invention is firmly connected to the hollow wrist of the coating robot via an adapter (1.3), and the master unit is configured in such a way that it has a coupling plate (1.2) which is arranged in the center of the cross section and which has a plurality of coupling points used to supply the atomizer with substances, energy and/or information. On the robot, the lines required for this purpose are firmly connected to the coupling plate (1.2).

Unlike with master-slave changing devices for typical handling robots, the connecting or locking mechanism (KS, FS) required to connect or lock the master unit (1) to the slave unit (2) in the atomizer changing system according to the invention surrounds the coupling plate (1.2) and is thus not on the inside but on the outside.

The connecting or locking mechanism is of both nonpositive (KS) and positive (FS) design.

The releasable connecting element (1.1) which surrounds the center of the master unit (1) and allows the nonpositive and positive connection (KS, FS) of the master unit (1) to the slave unit (2) is preferably designed as a flange, particularly preferably as a taper flange.

The design according to the invention and, in particular, a preferred additional nesting of the coupling plate (1.2) on the master side with the coupling plate (2.2) on the slave side also result in a radial increase in dielectric strength. The labyrinth of insulating walls which is obtained through the interaction between the coupling plate (1.2) and the coupling plate (2.2) forms extended paths for any creepage currents and is therefore a particularly effective insulating measure, which contributes in an advantageous manner to improving operational safety.

On the other hand, all the lines for substances, energy and information are in the master (1), which increases the flexibility and accessibility of the atomizers and simplifies the cleaning of the system.

Since the coupling plate (1.2) should as far as possible have universal suitability for many different atomizers, from pneumatic atomizers to high-rotation atomizers, it has a plurality of coupling points for supplying the respective atomizer with substances, energy and/or information.

As a particular preference, the coupling plate (1.2) comprises coupling points for coating medium lines, especially those designed for operation with or without high voltage, coupling points for pneumatic lines, especially for supply with turbine air flows, bearing air, bearing air monitoring, guiding air flows, control air flows, microphone air flows, purge air, air for thermal insulation and braking air, as well as coupling points for optical fibers.

In a very particularly preferred embodiment, the master coupling plate (1.2) has at least 28 coupling points, of which two are medium-carrying lines for operation without high voltage, five are medium-carrying lines for operation under high voltage, and twenty are pneumatic lines for turbine air flows, bearing air, bearing air monitoring, guiding air flows, control air flows, microphone air flows, purge air, air for thermal insulation and braking air, and one is an optical fiber coupling.

The coupling point embodied as a screwed bearing-air joint (FIG. 3:1.22, 2.22), which is supplied continuously with compressed air during operation, is preferably embodied in such a way that it is opened only when the master unit (1) is connected to the slave unit (2). This guarantees that the bearing air continuously applied to the master unit (1) cannot escape in an uncontrolled manner, thereby enabling costs and resources to be saved.

The atomizer changing system according to the invention can also be employed in high-voltage operation with corresponding atomizers up to about 100 kV without the need to embody the horizontal arm of the robot in an insulated form. The atomizer changing system according to the invention allows the use of the atomizer changing system in accordance with the requirements of EU Directives ATEX Product Directive 2014/34/EU and for ATEX Zone II 3G T3.

The atomizer changing system according to the invention is preferably composed substantially of a plastic which is not electrically conductive. Suitable plastics are polyoxymethylene (POM) and polyether ether ketone (PEEK), for example. In this case, it is possible to manufacture the slave unit (2) entirely from the plastic which is not electrically conductive and to manufacture the master unit (1) at least very largely from the plastic which is not electrically conductive. Thus, the master unit preferably contains less than 5% by weight, particularly preferably less than 3% by weight and very particularly preferably less than 2% by weight of metal components. If the master unit (1) contains metal components, these are generally threaded unions; high-voltage contacts, ground contacts, and safety cylinders (e.g. spring and piston). Despite the reduced-weight design using plastics which are not electrically conductive, an embodiment of this kind allows safe adaptation of atomizers up to a weight of at least 10 kg but quite possibly also higher weights, e.g. up to 13 kg, up to 15 kg or higher.

It is advantageous to position the center of gravity of the atomizer changing system (including the atomizer) as close as possible to the hollow wrist of the coating robot. The preferred way of achieving this is to make the master unit (1) as short as possible. However, high-voltage-proof equipment requires that certain insulating distances be maintained. These insulating distances are generally between 1.8 and 2.1 mm/kV and thus have a great influence on component dimensioning. In order to keep the insulating distances as short as possible, the preference is that all the medium-carrying lines, i.e. the lines carrying coating media, should have high-voltage-proof screwed joints (1.21, 2.21).

The screwed high-voltage joint (1.21) on the master side has a certain resistance to possible creepage currents or flashovers up to a certain voltage. In the case of the nut/media line/screwed joint combination, in the fully assembled state, the creepage current length is, on the one hand, increased and, on the other hand, the cavity between the nut/media line/screwed joint is preferably filled with an electrically insulating substance. Electrically insulating substances suitable for filling must have LABS conformity in accordance with VDMA 24364:2018-05 (LABS=paint wetting impairment substances; German: lackbenetzungsstörende Substanzen). These include appropriately conforming special greases and appropriately conforming vaselines.

The screwed joint (1.21) described preferably has a dielectric strength or resistance to creepage of about 50 kV, thereby making it possible to halve the insulating distance.

The screwed joints (1.21, 2.21) for media in general are preferably embodied in such a way as to be free from dead space to enable the cleaning process or the complete evacuation of the lines filled with liquid media to be carried out in the shortest possible time.

The slave unit (2) is matched to the respective atomizer and, in this arrangement, the interface with the atomizer forms the coupling plate (2.2) and a releasable connecting element (2.4), wherein the latter is preferably designed as a flange (2.4).

The coupling plate (2.2) of the slave unit (2) has lines on the atomizer side and/or has an adapter plate, preferably produced by 3-D printing, for substances, energy and information and is firmly connected to the atomizer. In this case, the slave coupling plate (2.2) is equipped with all the coupling points required for the operation of the respective atomizer.

The slave unit (2) is preferably embodied in such a way that it forms the male coupling component of the atomizer changing system. That is to say that the wear-sensitive sealing elements are situated in the slave unit (2). It is thereby possible to achieve maximum availability of the changing system.

The slave unit (2) preferably has a data carrier (2.7), which can be interrogated at any time by the master unit (1). For this purpose there is a reading unit (1.7), which is preferably situated on the master unit (1).

The data carrier (2.7) can also be used to ensure that the slave unit (2) connected to the atomizer is detected for placement in or removal from a magazine or a changing station.

However, in addition to fully automatic changing of the atomizers as well as placement in or removal from a magazine or a changing station, it is also possible to change the atomizer connected to the slave unit (2) manually at the robot without the need to approach a magazine or a changing station.

A practically implemented embodiment of the atomizer changing system according to the invention can be seen in FIGS. 2 to 4.

LIST OF REFERENCE SIGNS

1: master unit
1.1: releasable connecting element (taper flange) for non-positive and positive connection of the master unit (1) to the slave unit (2)
1.2: coupling points on the master unit (1)
1.21: (high-voltage-proof) screwed joint on the master unit (1)
1.22: screwed bearing-air joint on the master unit (1)
1.3: adapter for connecting the master unit (1) to the hollow wrist of a coating robot
1.4: safety cylinder of positive locking design
1.5: master-side coupling for high voltage or ground
1.6: centering bush or hole (for centering the slave unit when coupling)
1.7: reading unit for the data carrier 2.7
2: slave unit
2.1: releasable connecting element (taper flange) for non-positive and positive connection of the master unit (1) to the slave unit (2)
2.2: coupling plate on the slave unit (1)
2.21: (high-voltage-proof) screwed joint on the slave unit (2)
2.22: screwed bearing-air joint on the slave unit (2)
2.3: safety flange (centering or possibility of fixing the slave unit in the changing station)
2.4: releasable connecting element (adapter flange) for connecting the slave unit (2) to an atomizer
2.5: slave-side coupling for high voltage or ground
2.6: centering pins (for centering the slave unit when coupling)
2.7: data carrier
KS: nonpositive connection
FS: positive connection

The invention claimed is:
1. An atomizer changing system, comprising a master unit and at least one slave unit, wherein the master unit has at least the following components:
  a releasable master-side connecting element, surrounding a center of the master unit, for a nonpositive and positive connection (KS, FS) of the master unit to the at least one slave unit,
  a master-side coupling plate arranged in the center of the master unit and having a plurality of coupling points for supplying an atomizer that can be connected thereto with substances, energy and/or information, and
  an adapter for connecting the master unit to a hollow wrist of a coating robot; and wherein
the at least one slave unit has at least the following components:
  a slave-side coupling plate for connecting the at least one slave unit to the master unit and to the atomizer, wherein the slave-side coupling plate is firmly connected on the atomizer side to lines and/or to an adapter plate for supplying the connectable atomizer with substances, energy and/or information; and
  a slave-side releasable connecting element for connecting the at least one slave unit to the atomizer.

2. The atomizer changing system as claimed in claim 1, wherein the master-side coupling plate has the plurality of coupling points selected from a group consisting of coupling points for coating medium lines, coupling points for pneumatic lines and coupling points for optical fibers.

3. The atomizer changing system as claimed in claim 2, wherein the plurality of coupling points for coating medium lines are designed for operation with or without high voltage, and the plurality of coupling points for pneumatic lines are used for supply with turbine air flows, bearing air, bearing air monitoring, guiding air flows, control air flows, microphone air flows, purge air, air for thermal insulation and braking air.

4. The atomizer changing system as claimed in claim 3, wherein the coupling point for the bearing air is embodied in such a way that it is opened only when the master unit is connected to the at least one slave unit.

5. The atomizer changing system as claimed in claim 1, wherein the system is composed substantially of a plastic which is not electrically conductive.

6. The atomizer changing system as claimed in claim 5, wherein the at least one slave unit is composed of a plastic which is not electrically conductive, and the master unit is composed of at least 95% by weight, relative to a weight of the master unit, of a plastic which is not electrically conductive.

7. The atomizer changing system as claimed in claim 1, wherein the atomizer is supplied with coating media via lines that carry coating media and that are connected to the coupling plates via high-voltage-proof screwed joints.

8. The atomizer changing system as claimed in claim 7, wherein the high-voltage-proof screwed joints are embodied in such a way as to be free from dead space.

9. The atomizer changing system as claimed in claim 1, wherein the at least one slave unit comprises a data carrier which can be read by a reading unit mounted on the master unit.

10. The atomizer changing system as claimed in claim 1, wherein the master-side coupling plate and the slave-side coupling plate are embodied in such a way that a labyrinth for any creepage currents obtained when the two coupling plates are joined together.

* * * * *